United States Patent [19]

Fonda-Bonardi

[11] 4,372,731

[45] Feb. 8, 1983

[54] FLUID FLOW CONTROL SYSTEM

[76] Inventor: Giusto Fonda-Bonardi, 2075 Linda Flora Dr., Los Angeles, Calif. 90024

[21] Appl. No.: 196,923

[22] Filed: Oct. 14, 1980

[51] Int. Cl.³ .......................... F03B 3/18; F04D 29/46
[52] U.S. Cl. ..................................... 415/166; 415/151
[58] Field of Search .................. 415/76, 90, 163, 164, 415/165, 166, 211, 45, 147, 148, 151, 159, 186

[56] References Cited

U.S. PATENT DOCUMENTS

| | | | |
|---|---|---|---|
| 3,162,421 | 12/1964 | Schwarz | 415/166 |
| 3,232,581 | 2/1966 | Swearingen | 415/163 |
| 3,495,921 | 2/1970 | Swearingen | 415/163 |

*Primary Examiner*—Harvey C. Hornsby
*Assistant Examiner*—Arthur D. Dahlberg
*Attorney, Agent, or Firm*—James E. Brunton

[57] ABSTRACT

A fluid flow control system for use with turbines, such as the Tesla-type turbine, where the power fluid contains large amounts of impurities and where it is desired to closely modulate the flow of the fluid to the turbine. The fluid flow channels to the turbine wheel are defined by a plurality of cooperating fluid flow confining blades which may be adjusted to controllably vary the cross-sectional area of the fluid flow channels. The convergent inlet portions and substantially parallel outlet portions of the fluid flow channels as defined by the blades provide a geometry which is highly conducive to the dampening of upstream turbulence and to the injection toward the turbine wheel of an essentially laminar jet. The configuration of the blades and the manner of their adjustment is such that the angular convergence of the inlet portions and the parallelism of the outlet portions of the channels does not change as the blades are adjusted to vary the cross-sectional area of the channels.

7 Claims, 6 Drawing Figures

FLUID FLOW CONTROL SYSTEM

BACKGROUND OF THE INVENTION

1. Field of the Invention

The present invention relates generally to fluid flow control mechanisms. More particularly the invention relates to a fluid flow injection control mechanism for use with Tesla-type turbines where it is desired to control the mass flow of the fluid to the turbine without changing the fluid injection angle and without introducing turbulence.

2. Discussion of the Prior Art

Tesla-type, bladeless turbines present many advantages in cases where the power fluid contains large amounts of impurities, such as is the case of geothermal water or the product of the gasification of coal. However, heretofore this type of turbine has not been extensively used primarily because of problems with the fluid injection mechanisms available for use with the turbines.

Existing fluid injecting mechanisms suitable for use with Tesla-type turbines are either fixed or movable by rotation. In the case of fixed mechanisms, the fluid is injected at a constant angle but no control is provided. Accordingly, in such mechanisms any required modulation of the mass flow, such as is needed to meet the demands of a variable load, must be met by means of a throttling valve located upstream of the injection mechanism. The use of a throttling valve, however, invariably results in a loss of efficiency, severe turbulence in the fluid and the possibility of vapor flashing and liquid slugging.

In the case of rotatable mechanisms, control is typically achieved by rotating a plurality of shaped elements which vary the area open to the flow between them. These types of devices tend to obviate some of the difficulties inherent in fixed type mechanisms, but at the cost of a change in injection angle and flow geometry which invariably results in a substantial decrease in operating efficiency.

The present invention concerns a unique mechanism for controllably injecting variable amounts of fluid into a Tesla-type bladeless turbine without any changes in injection angle or in fluid flow geometry.

As will become apparent from the discussion which follows, the apparatus of the present invention effectively overcomes the drawbacks of the prior art fluid injection mechanisms and for the first time provides a viable fluid flow control mechanism for use with Tesla-type turbines.

Applicant is familiar with the patents issued to J. S. Swearingen, U.S. Pat. Nos. 3,495,921 and 3,232,581, which patents represent the most pertinent art known to applicant and which serve to clearly illustrate the novelty of the present invention.

SUMMARY OF THE INVENTION

It is an object of the present invention to provide a fluid injection mechanism in which variable amounts of fluid can be controllably injected into a turbine without changing the angle at which the fluid is injected.

It is another object of the invention to provide a fluid injection mechanism of the aforementioned character in which the fluid flow channels defined by the adjustable fluid flow confining elements of the mechanism have convergent inlet portions and substantially parallel outlet portions thus providing a geometry conducive to the injection of an essentially laminar jet and to the dampening of any turbulence which may be present in the fluid upstream of the fluid flow channels.

It is another object of the invention to provide a mechanism of the type described in the preceding paragraph in which the fluid flow confining elements of the device can be articulated to precisely vary the cross-sectional area of the fluid flow channels without changing the angular convergence of the inlet portions and the parallelism of the outlet portions of the channels.

It is still another object of the invention to provide a fluid injection mechanism of the character described in which the fluid flow confining elements which define the fluid flow channels leading to the turbine are configured and arranged so that the fluid jets issuing from adjacent channels merge smoothly as they impinge upon the turbine.

It is a further object of the invention to provide a fluid injection mechanism of the class described which is of simple construction, embodies a minimum number of parts, is highly reliable and is substantially maintenance free even when used in hostile environments.

In summary, these and other objects of the invention are realized by a fluid injection control mechanism for use in conjunction with radial turbines of the type having a housing provided with a fluid inlet and a rotor rotatably mounted on an axis within the housing, the control mechanism comprising a pair of spaced apart, axially aligned, annular shaped plates fixedly mounted within the housing about the axis thereof, the plates being provided on their opposing faces with a plurality of grooves located at circumferentially spaced intervals; a plurality of fluid flow confining elements mounted between the plates each being carried in a pair of the grooves for sliding translational movement therewithin, the elements cooperating together to define a plurality of fluid flow channels in communication with the fluid inlet; and a control assembly for simultaneously translating each of the fluid flow confining elements equidistantly within the grooves provided in the plates.

BRIEF DESCRIPTION OF THE DRAWINGS

In FIG. 3 these elements are shown in their closed position restricting fluid flow to the turbine wheel.

DESCRIPTION OF ONE EMBODIMENT OF THE INVENTION

Figure 1:
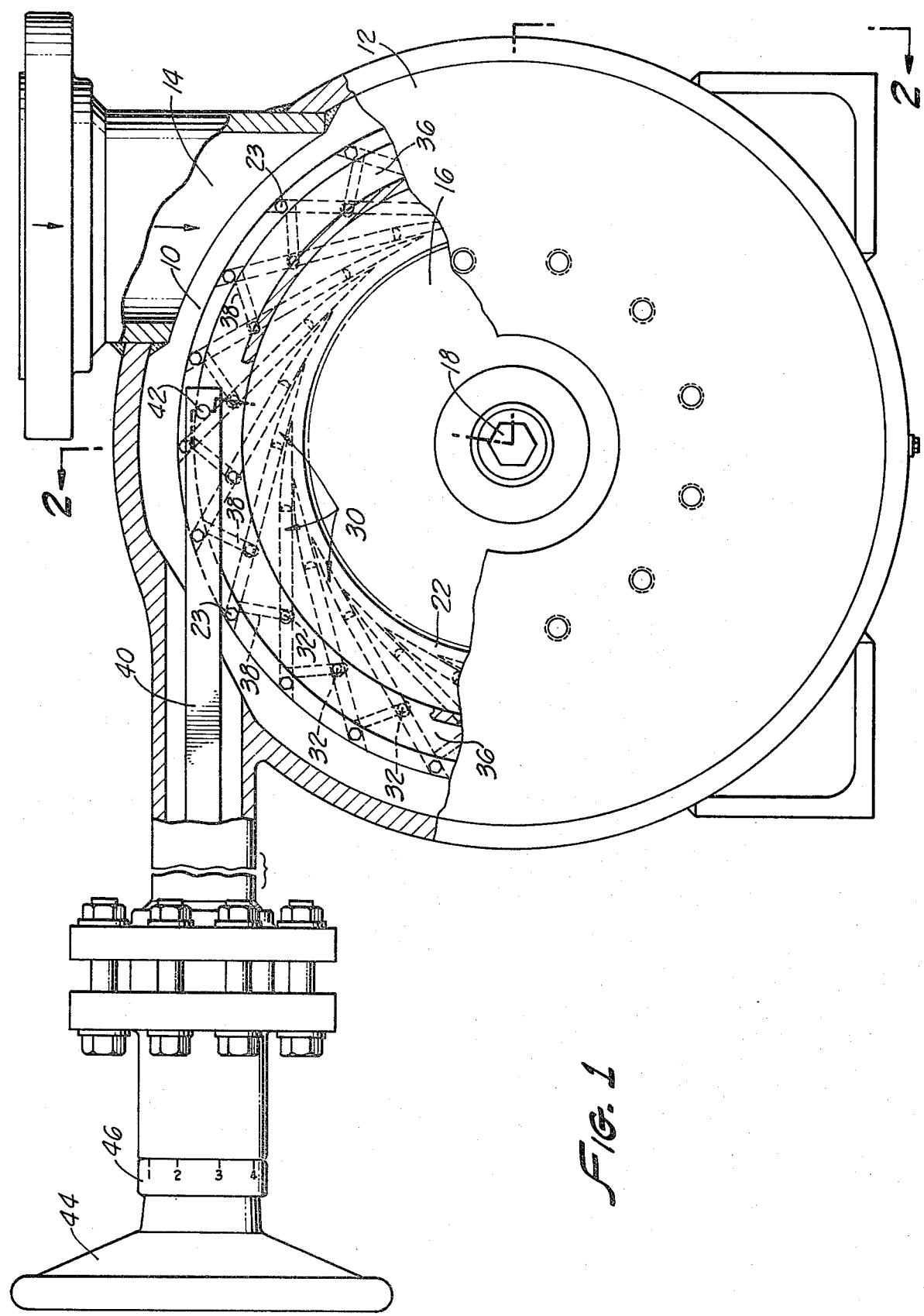
FIG. 1 is a side elevational view, partly broken away to show internal construction, of the fluid flow control mechanism of the present invention as it appears when used in conjunction with a radial turbine of the Tesla-type.
Figure 2:
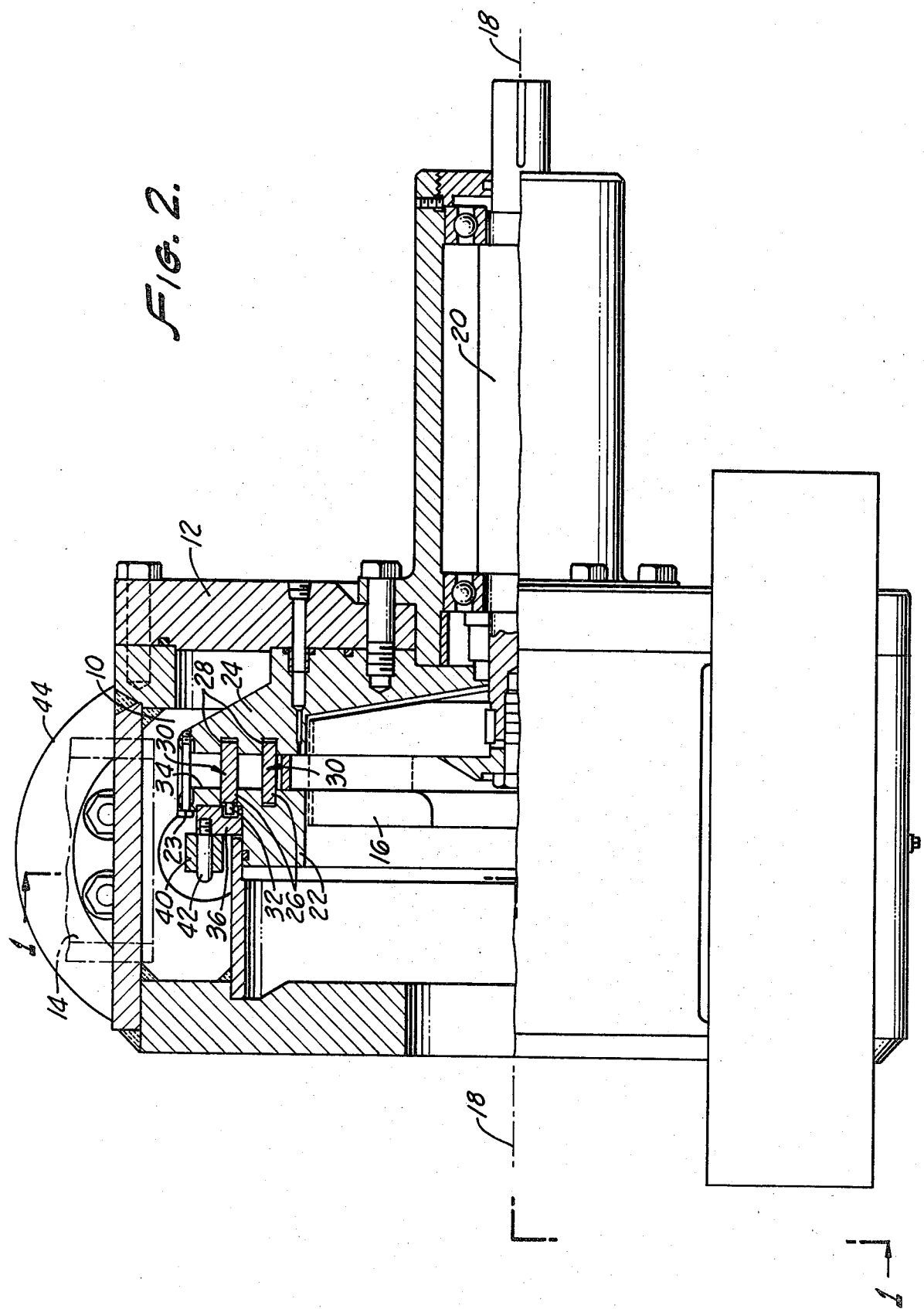
FIG. 2 is a cross-sectional view taken along lines 2—2 of FIG. 1 showing another view of the internal construction of the fluid flow control mechanism of the invention.

Referring to the drawings, and particularly to FIGS. 1 and 2, the fluid injection control mechanism of the present invention, is shown being used in conjunction with a radial turbine of the Tesla-type having an outer housing 12 provided with a fluid inlet 14 and having a rotor, or turbine wheel, 16 mounted for rotation about the central axis 18 of housing 12. As best seen in FIG. 2, the rotor, or wheel assembly 16, is of standard construction being connected to a drive shaft 20 which extends laterally of housing 12.

In the embodiment of the invention depicted in the drawings, the fluid injection control mechanism 10 comprises first and second spaced apart axially aligned annular shaped members, or plates 22 and 24 (FIG. 2) which are fixedly mounted within housing 12 concentrically with axis 18 thereof. Plates 22 and 24 are joined together by a plurality of bolts 23 (see FIG. 5) and are provided on their opposing faces with a plurality of circumferentially spaced apart grooves, or guide channels, 26 and 28. Mounted between plates 22 and 24 are a plurality of fluid flow confining elements 30. As best seen by referring to FIGS. 4 and 5, each element 30 is carried within opposing grooves 26 and 28 of plates 22 and 24 for a controlled sliding translational movement therewithin.

Figure 3:
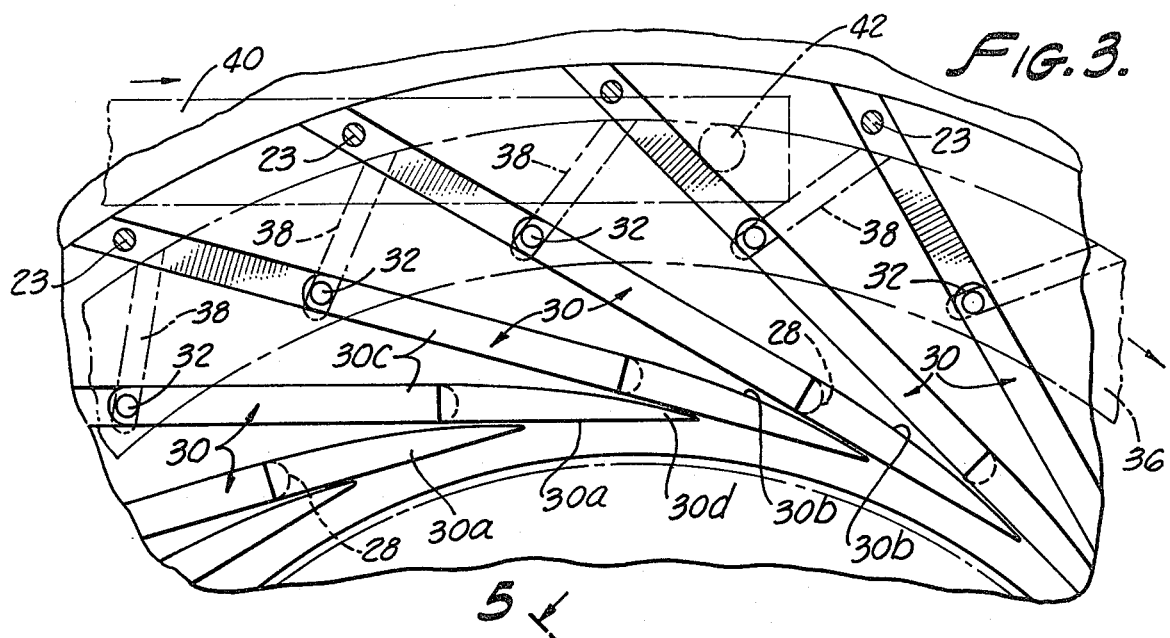
FIG. 3 is a greatly enlarged side elevational, fragmentary view of the fluid flow confining elements of the device which define the fluid flow channels leading toward the turbine wheel.
Figure 4:
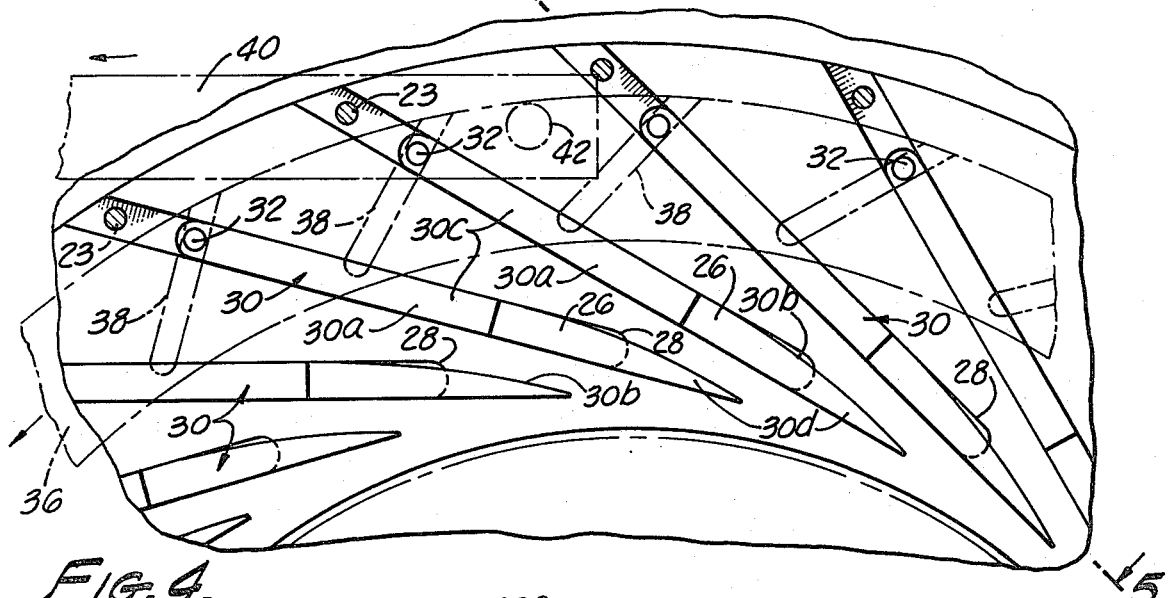
FIG. 4 is a side elevational view similar to FIG. 3, but showing the fluid flow confining elements in their open position, permitting full fluid flow to the turbine wheel.
Figure 5:
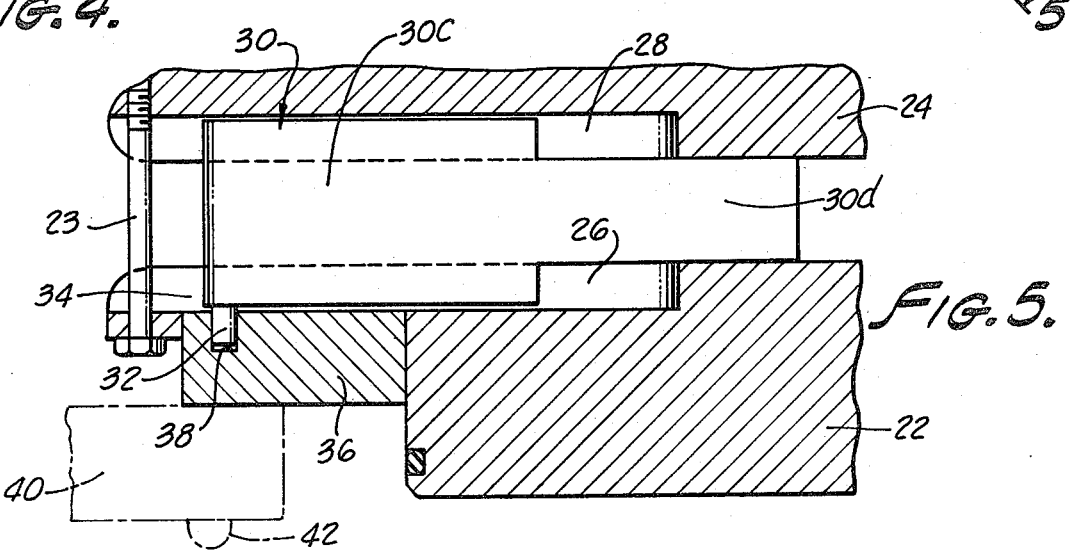
FIG. 5 is a cross-sectional view taken along lines 5—5 of FIG. 4 showing a top view of the fluid flow confining elements of the apparatus.

Turning to FIGS. 4 and 5, it can be seen that each element 30 is specially configured having a substantially flat bottom surface 30a and a curved upper surface 30b. Referring particularly to FIG. 5, it is to be observed that each element 30 has a main body portion 30c and a longitudinally extending tongue portion 30d. As clearly seen in FIG. 5, body portion 30c is slidably mounted within grooves 26 and 28 and tongue portion 30d extends between the spaced apart plates 22 and 24. Each element 30 is also provided with a laterally extending tang 32, the purpose of which will presently be described. As indicated in FIGS. 3 and 4, the fluid flow channels defined by elements 30 have a convergent inlet portion gradually changing to a parallel outlet or discharge portion. This geometry is conducive to dampening upstream turbulence in the power fluid and to ensuring the injection toward the turbine wheel of a substantially laminar jet.

First member 22 is also provided with a plurality of circumferentially spaced apart elongated openings extending therethrough (FIGS. 2 and 5). Each of the openings, designated by the numeral 34 in FIG. 2, is substantially coextensive with the groove 26 formed in plates 22 and is adapted to closely receive tang 32 of element 30. Disposed adjacent to, and in axial alignment with, first plate 22 is a third annular shaped member, or plate, 36 which is mounted for relative rotational movement with respect to plate 22. As illustrated in FIGS. 3 and 4, plate 36 is provided with a plurality of sub-radial grooves 38 (shown in phantom in FIGS. 3 and 4). As depicted in FIGS. 3 and 4, as ring member 36 is rotated with respect to ring 22, tangs 32 will move within the slots 38 formed therein. For example, when ring 36 has been rotated in a clockwise direction to its furthermost position shown in FIG. 3, tangs 32 will be disposed proximate the inner extremities of slots 38. When ring 36 is rotated from this position in a counter clockwise direction to the position shown in FIG. 4, tangs 32 will be caused to move outwardly within slots 38 to the position shown in FIG. 4 wherein they are located proximate the outer ends of slots 38. This movement of tangs 32 within slots 38 causes translational movement of elements 30 within grooves 26 and 28 from the fully extended position shown in FIG. 3 to the fully open position shown in FIGS. 4 and 5. It is this movement of elements 30 which controllably increases or decreases the cross-sectional area of the fluid channel defined by the adjacent elements 30.

In the form of the invention herein described, the means for imparting rotational movement to the third annular shaped member 36 comprises a reciprocally movable elongated control rod 40 (FIG. 1). One end of control rod 40 is connected to member 36 by a suitable threaded connector 42 (FIG. 2) and the opposite end of rod 40 extends exteriorly of the turbine housing 12 where it can be interconnected with any type of suitable mechanism for effecting controlled reciprocal movement of the rod. In the embodiment of the invention shown in FIG. 1, this mechanism comprises a rotatable hand wheel 44 which is interconnected with the outboard end of rod 40. A scale 46 is provided proximate wheel 44 to indicate the degree of rotation of the wheel and the corresponding degree of reciprocal movement of rod 40. Thusly, scale 46 can readily be calibrated to precisely indicate the spacing between elements 30a within the fluid injection control mechanism. It is to be understood that other well known mechanical means for rotating plate 36 can readily be employed depending upon the configuration of the turbine housing.

Figure 6:
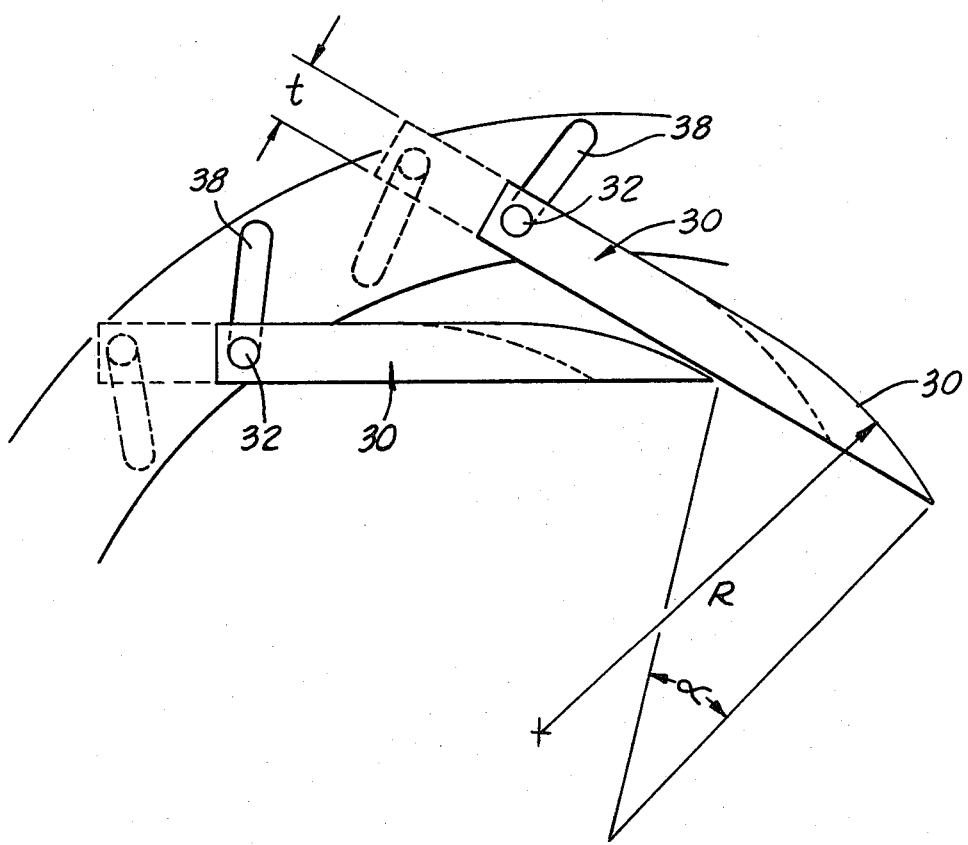
FIG. 6 is a generally schematic view of a pair of cooperating fluid flow confining elements illustrating the geometrical configuration thereof.

An important characteristic of the fluid injection control mechanism of the present invention is that the fluid flow confining elements 30 are movable by the control means to precisely vary the cross-sectional area of the fluid flow channels defined by the elements while at the same time maintaining the angular convergence of the inlet portions and the parallelism of the outlet portions of the fluid flow channels defined by the elements. The geometrical configuration of the fluid flow confining elements necessary to accomplish this result is illustrated in FIG. 6. In FIG. 6, the solid lines depict the elements 30 in their closed position (also illustrated in FIG. 3) and the phantom lines show the elements 30 in their retracted, or open, position (as shown in FIG. 4). The geometry of the elements 30 may be expressed as follows: If the radius of curvature of the curved upper surface 30b of elements 30 is "R", the thickness of the elements 30 is "t", and the sub-tended angle defined by the ends of elements 30 when in their closed position is $\alpha$ then the geometrical relationship necessary to achieve the aforementioned result is:

$$t = R(l_0 - \cos \alpha)$$

where $\alpha = 360/n$ and $n =$ the number of elements 30.

The above defined geometrical relationship insures that the tangent to the curve at the end of each element 30 is parallel to the next adjacent elements so that the channel between the elements commences upstream with a convergence angle equal to $\alpha$ and ends with parallel walls.

As previously mentioned the unique construction described in the preceeding paragraph provides a geometry which is highly condusive to the dampening of any turbulence which may be present in the upstream power fluid. Additionally, the geometry insures the injection of fluid toward the turbine wheel in an essentially laminar jet. Furthermore, with the novel arrangement thus described, the fluid jets issuing from adjacent fluid flow channels will merge smoothly since they come together at the trailing edge of each element 30 by flowing along the smooth upper and lower surfaces of each element. To optimize this smooth merging of the fluid streams, the trailing edge angle, α should preferably not be larger than 15°, and accordingly the number of plates preferably should not be smaller than 24.

As illustrated in FIGS. 3 and 4, as the elements 30 are simultaneously translated along their longitudinal axis by rotation of member 36, the above identified relationships do not change even though the fluid flow channel defined by adjacent elements can be made to carry between zero, when all the blades touch (FIG. 3), to a maximum when all the elements are withdrawn to the extreme limit of their travel (FIG. 4).

This parallel translation of the elements 30 is, of course, guaranteed by the configuration of the grooves 26 and 28 formed in first and second members 22 and 24. It is apparent that where the number "n", as used in the preceeding equation, equals the number of elements 30, the number of grooves provided in each ring will also be equal to the number "n". Similarly, the angles between the axis of successive grooves will be α, and each groove will be of such a width that it will accept the thickness of each element 30 with a minimum operating clearance.

OPERATION

With the control mechanism of the invention mounted within the turbine housing 12 and surrounding the turbine wheel 16 in the manner illustrated in FIG. 1, control wheel 44 is rotated to its maximum open position. This causes rotation of ring 38 in a counter clockwise rotation which in turn causes the fluid flow confining elements 30 to move within grooves 26 and 28 into their full open position as shown in FIG. 4. Power fluid is then introduced into the turbine housing through inlet 14 as indicated by the directional arrows. This fluid will circulate about the periphery of housing 12 and will be injected inwardly toward the turbine wheel through the fluid flow channels defined by the adjacent fluid flow confining elements 30. As previously mentioned and as illustrated in FIG. 4, elements 30 define flow channels which have convergent inlet portions grandually changing to parallel discharge portions.

After the turbine wheel is brought up to speed, the cross-sectional area of the fluid flow channels defined by the elements 30 may be reduced by rotation of wheel 44 is a direction which causes ring 36 to move in a clockwise direction (see FIG. 3). Rotation of wheel 44 to its maximum extent will result in elements 30 moving into the closed relationship depicted in FIG. 3. It is, of course, apparent that the elements may be positioned at any location intermediate the positions illustrated in FIGS. 3 and 4.

Due to the unique geometrical relationship of the component parts of the apparatus as herein described, as elements 30 are moved toward the closing position, illustrated in FIG. 3, the angular convergence of the inlet portion and the parallelism of the exit portion do not change as the elements are translated within the grooves provided in rings 22 and 24. This unique feature markedly contributes to the vastly superior operating characteristics of the mechanism when compared to other related prior art devices.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A fluid injection control mechanism for use in conjunction with radial turbines of the type having a housing provided with a fluid inlet and a rotor rotatably mounted on an axis within the housing, said control mechanism comprising:
   (a) a pair of spaced apart, axially aligned, annular shaped plates fixedly mounted within the housing about the axis thereof, said plates being provided on their opposing faces with a plurality of grooves located at circumferentially spaced intervals;
   (b) a plurality of fluid flow confining elements mounted between said plates each being carried in a pair of said grooves for sliding translational movement therewithin, said elements cooperating together to define a plurality of fluid flow channels in communication with said fluid inlet; and
   (c) control means for simultaneously translating each said fluid flow confining element equidistantly within the grooves provided in said plates.

2. A fluid injection control mechanism as defined in claim 1 in which said fluid flow confining elements are configured so as to define fluid flow channels having convergent inlet portions and substantially parallel outlet portions.

3. A fluid injection control mechanism as defined in claim 2 in which said fluid flow confining elements are movable by said control means within said grooves formed in said plates to controllably vary the cross-sectional area of the fluid flow channels defined thereby.

4. A fluid injection control mechanism as defined in claim 3 in which said fluid flow confining elements are movable by said control means to vary the cross-sectional area of the fluid flow channels while still maintaining the angular convergence of the inlet portions and the parallism of the outlet portions of the fluid flow channels defined thereby.

5. A fluid injection control mechanism as defined in claim 1 in which each of said fluid flow confining elements is provided with a laterally projecting tang; in which one of said annular shaped plates is provided with a plurality of circumferentially spaced apart elongated openings extending therethrough and adapted to receive said tangs; and in which said control means comprises:
   (a) a control element mounted adjacent said one of said annular shaped plates for relative rotational movement with respect thereto, said control element having a plurality of slots formed therein for closely receiving said tangs of said confining elements; and
   (b) means for imparting rotational movement to said control element whereby said fluid flow confining elements will be translated within said grooves formed in said plates.

6. A fluid flow control mechanism for use in conjunction with radial turbines of the type having a housing provided with a fluid inlet and a rotor rotatably mounted on an axis within the housing, said control mechanism comprising:
   (a) first and second spaced apart, axially aligned, annular shaped plates fixedly mounted within the housing about the axis thereof, said plates being provided on their opposing faces with a plurality of grooves located at circumferentially spaced intervals and said first plate being provided with a plurality of circumferentially spaced apart elongated openings extending therethrough, said openings being aligned with the grooves formed in said first plate;

(b) a plurality of fluid flow confining elements mounted between said plates each being carried in a pair of said grooves for sliding translational movement therewithin, each of said elements having a substantially flat bottom surface, a curved upper surface and each having a tang protruding laterally from one side thereof said tangs of each said element being adapted to extend through the openings provided in said first plate, said fluid flow confining elements cooperating together to define a plurality of fluid flow channels in communication with said fluid inlet;

(c) a third annular shaped plate disposed adjacent to and in axial alignment with said first plate, said third plate being mounted for relative rotational movement with respect to said first plate and having a plurality of subradial slots formed therein adapted to receive the tangs of said fluid flow confining elements; and (d) means for imparting rotational movement to said third annular shaped member whereby said fluid flow confining elements will be moved within said grooves formed in said first and second plates.

7. A fluid flow control mechanism as defined in claim 6 in which said means for imparting rotational movement to said third annular shaped member comprises a reciprocally movable elongated control rod one end of which is connected to said third plate and the other end of which extends exteriorly of the turbine housing.

* * * * *